US011106471B2

(12) United States Patent
Poosapalli et al.

(10) Patent No.: US 11,106,471 B2
(45) Date of Patent: Aug. 31, 2021

(54) SYSTEM AND METHOD TO SECURELY MAP UEFI ISCSI TARGET FOR OS BOOT USING SECURE M-SEARCH COMMAND OPTION IN UEFI DISCOVER PROTOCOL

(71) Applicant: DELL PRODUCTS L.P., Round Rock, TX (US)

(72) Inventors: Karunakar Poosapalli, Bangalore (IN); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 279 days.

(21) Appl. No.: 16/370,048

(22) Filed: Mar. 29, 2019

(65) Prior Publication Data

US 2020/0310823 A1 Oct. 1, 2020

(51) Int. Cl.
*G06F 9/4401* (2018.01)
*G06F 21/57* (2013.01)

(52) U.S. Cl.
CPC .......... *G06F 9/4406* (2013.01); *G06F 9/4411* (2013.01); *G06F 21/575* (2013.01)

(58) Field of Classification Search
CPC .... G06F 21/575; G06F 9/4401; G06F 9/4406; G06F 9/4411
See application file for complete search history.

(56) References Cited

U.S. PATENT DOCUMENTS

| | | | |
|---|---|---|---|
| 7,865,775 B2 | 1/2011 | Yao et al. | |
| 7,984,108 B2 | 7/2011 | Landis et al. | |
| 8,060,542 B2 | 11/2011 | Shankar et al. | |
| 9,442,876 B2 | 9/2016 | Hormuth et al. | |
| 9,465,771 B2 | 10/2016 | Davis et al. | |
| 10,146,556 B2 | 12/2018 | Rose et al. | |
| 2005/0071677 A1* | 3/2005 | Khanna | H04L 67/34 726/4 |
| 2005/0283615 A1* | 12/2005 | Chakravarthi | H04L 63/101 713/182 |
| 2006/0173912 A1 | 8/2006 | Lindvall et al. | |
| 2006/0218388 A1* | 9/2006 | Zur | G06F 9/4416 713/2 |

(Continued)

FOREIGN PATENT DOCUMENTS

EP 1918815 B1 9/2007

OTHER PUBLICATIONS

Schneier, B. (2015). Applied cryptography: Protocols, algorithms, and source code in C. Indianapolis, IN: Wiley. (Year: 2015).*

*Primary Examiner* — Jaweed A Abbaszadeh
*Assistant Examiner* — Brian J Corcoran
(74) *Attorney, Agent, or Firm* — Jackson Walker LLP; Christopher J. Rourk

(57) ABSTRACT

A method for secure data communications using an insecure protocol, comprising generating a data message at a data processor client. Adding a security key to the data message using the data processor client. Transmitting the data message to a remote data processor receiver over a data network. Determining whether the data message is authentic at the remote data processor receiver. Automatically responding to the data message with a location where additional data can be obtained from the remote data processor receiver if it is determined by the remote data processor receiver that the data message is authentic.

15 Claims, 2 Drawing Sheets

(56) References Cited

U.S. PATENT DOCUMENTS

| | | | |
|---|---|---|---|
| 2007/0061441 A1 | 3/2007 | Landis et al. | |
| 2007/0067366 A1 | 3/2007 | Landis | |
| 2007/0233845 A1* | 10/2007 | Song | H04L 12/2818 709/223 |
| 2010/0077066 A1* | 3/2010 | Chawla | G06F 9/4416 709/222 |
| 2019/0312851 A1* | 10/2019 | Campagna | H04L 63/0823 |

* cited by examiner

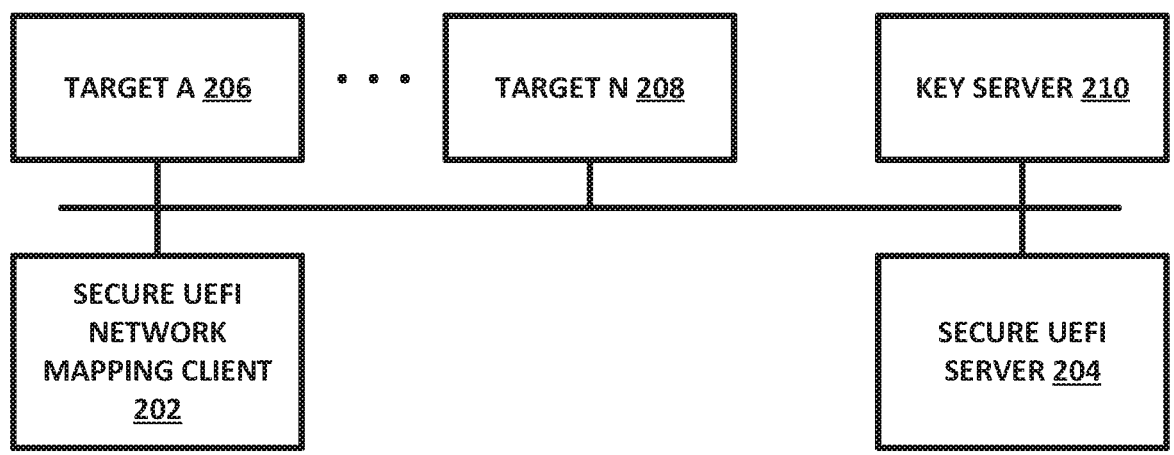
FIGURE 2    200
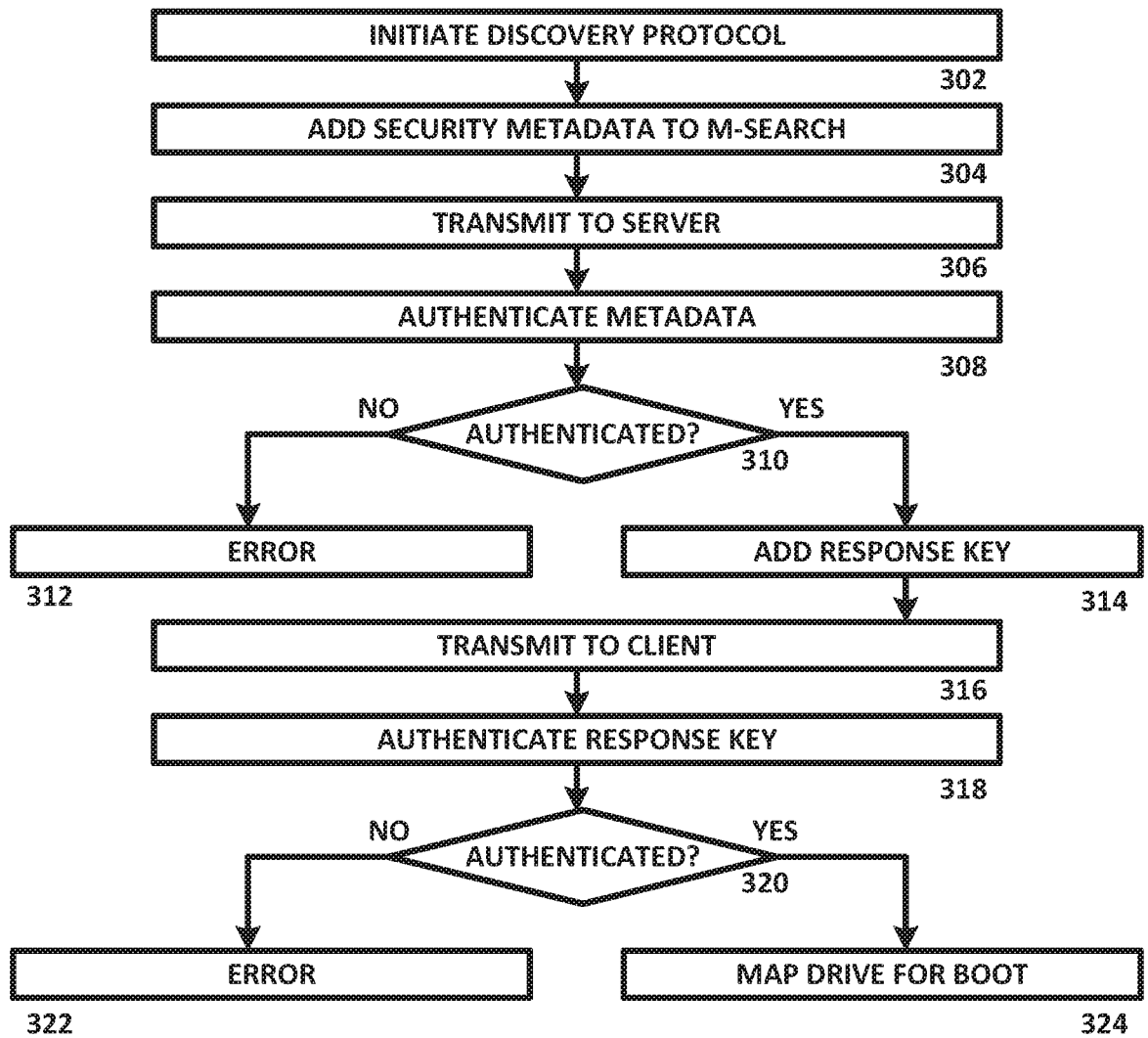
FIGURE 3    300

SYSTEM AND METHOD TO SECURELY MAP UEFI ISCSI TARGET FOR OS BOOT USING SECURE M-SEARCH COMMAND OPTION IN UEFI DISCOVER PROTOCOL

TECHNICAL FIELD

The present disclosure relates generally to data communications, and more specifically to a system and method to securely map a UEFI iSCSI target for OS boot using a secure M-Search command option in a UEFI discover protocol.

BACKGROUND OF THE INVENTION

Loading the image of an operating system (OS) from a remote source during processor boot can expose the processor to malicious code. While there are many benefits from maintaining the OS for a processor at a remote location, ensuring that the OS is not compromised is difficult.

SUMMARY OF THE INVENTION

A method for secure data communications using an insecure protocol is disclosed that includes generating a data message at a data processor client, and adding a security key to the data message using the data processor client. The data message is then transmitted to a remote data processor receiver over a data network, and it is determined whether the data message is authentic at the remote data processor receiver. A response to the data message that includes a location where additional data can be obtained from is automatically generated by the remote data processor receiver if it is determined by the remote data processor receiver that the data message is authentic.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 2 is a diagram of a system to securely map a target drive for OS boot using a secure M-Search protocol, in accordance with an example embodiment of the present disclosure; and FIG. 3 is a diagram of an algorithm to securely map a target drive for OS boot using a secure M-Search protocol, in accordance with an example embodiment of the present disclosure.

DETAILED DESCRIPTION OF THE INVENTION

Figure 1:
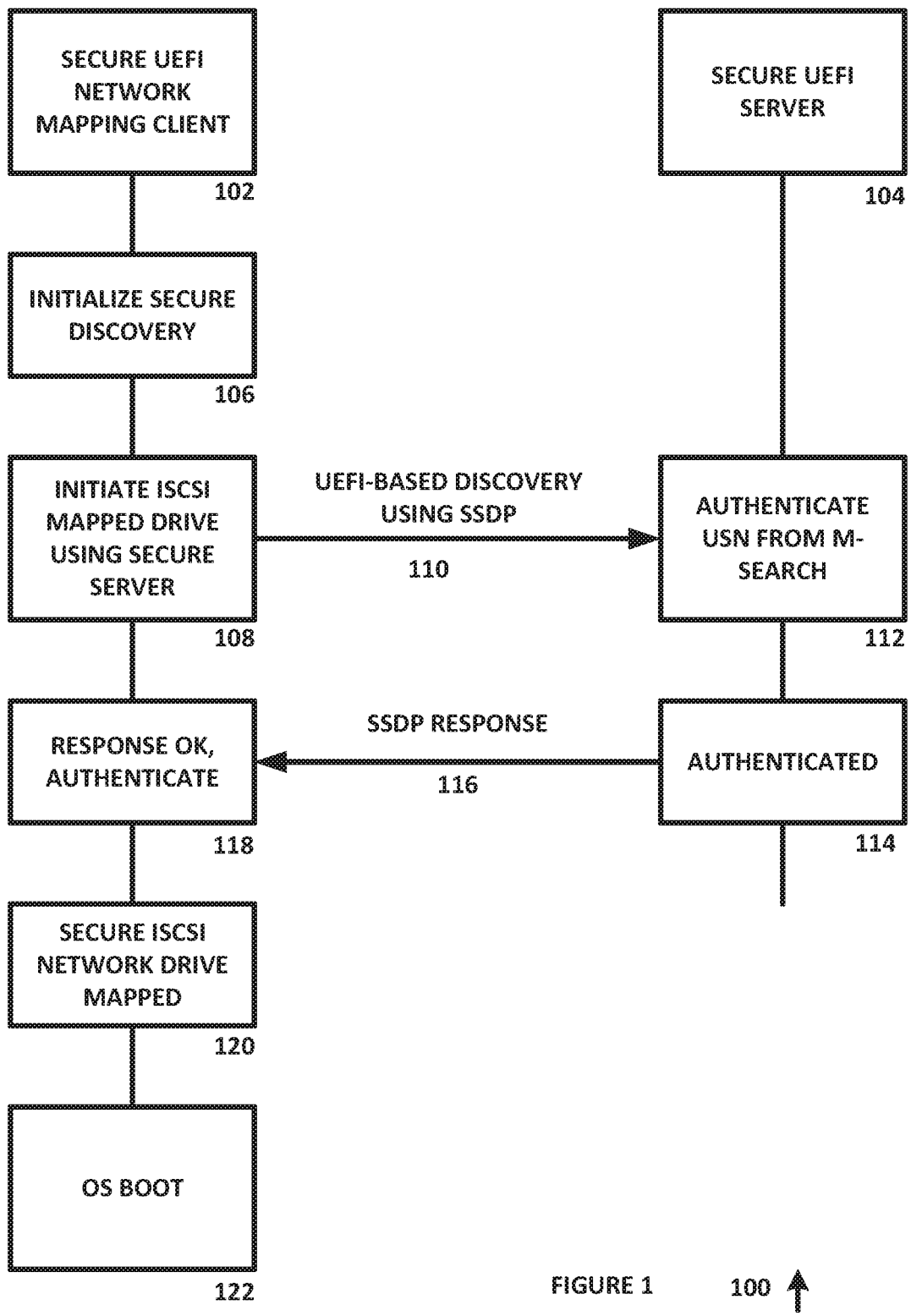
FIG. 1 is a diagram of an algorithm to securely map a target drive using a client and a server, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The process of booting a processor starts with executing firmware that has been stored into a predetermined data memory address of a data memory device of the processor. Prior to booting of a processor, it is necessary to load firmware for the processor into a memory device of the processor, and that is usually done by the original equipment manufacturer (OEM). The firmware controls the operations of the processor, and does not change after booting. Because firmware is stored in the processor memory before booting, it is considered secure because it would be difficult to access and modify the firmware.

One of the primary functions of the firmware is to load the OS. At present, the secured pre-boot firmware environment does not have a mechanism to allow it to trust non-EFI or non-executable files while loading files from an external source, such as a hard drive or over a network. For example, some OS software can require a preloaded certificate to establish an https connection to a support server. This certificate is placed in the firmware. However, neither the certificate nor the firmware are digitally signed, because digital signatures can typically only be used once and may have a limited lifetime to prevent brute force attempts to guess the digital signature, which does not allow them to be preloaded. This configuration creates a security threat in compromising the certificate, because it can be discovered by a third party and used to attack either the processor or potentially the server.

For example, a process called "Secure Boot" causes the firmware to determine whether the system boot loader software contains a cryptographic key that has been authorized by a database. With adequate signature verification in the next-stage boot loader(s), kernel, and, potentially, user space, it is possible to prevent the execution of unsigned code. However, Secure Boot does not utilize cryptographic keys with remote attestation, which makes it vulnerable to attack.

A system and method are disclosed to use a discovery protocol, such as the simple service discovery protocol (SSDP) or the Redfish Discovery Protocol from Dell of Austin, Tex., to find a source for the OS code. However, such discovery protocols may use the Universal Plug and Play (UPnP) M-Search protocol to discover a target source that can provide the OS. Discovery of the target using M-Search uses a multicast address, which creates several vulnerabilities, such as cross-site scripting (XSS) vulnerability in the Unicode version of M-Search, which allows remote attackers to inject arbitrary web script or HTML using an unspecified vector. For example, a discovery service using the Redfish based discovery protocol may use M-Search during a Unified Extensible Firmware Interface (UEFI)-based OS boot, such as using the Internet Small Computer Systems Interface (iSCSI) protocol.

When using such M-Search protocols, one way to make them secure is to ensure that the target OS source that is discovered has been authenticated before it is mapped as the source for the OS. If there are any vulnerabilities in the remote target, then it should be mapped to the boot path. The present disclosure provides a system and method for eliminating this vulnerability in M-Search based discovery protocols, and also provides a secure system and method to map a remote target such as an iSCSI network drive for an OS boot process.

In one example embodiment, the UEFI-based Redfish discovery protocol can use the UEFI 2.8 draft specification work flow, which is modified as follows. First, a UEFI based client can use the Redfish discovery protocol to initiate OS discovery. Before the request is sent out, the user agent of the request header of the M-Search option can be filled with UEFI-based security metadata, such as in a field of the metadata of the security binary large object (BLOB). On the Redfish service exposing the OS based target, the Redfish service authenticates the metadata in the user agent. While this example utilizes Redfish, other suitable protocols can also or alternatively be used.

The present disclosure provides numerous technical features that provide a practical application and substantially more than the prior art. For example, the present disclosure provides for secure mapping of a remote target during the pre-Boot process, using authentication metadata in the user agent of an M-Search protocol. For a Redfish application, the present disclosure can provide secure authentication of the Redfish discovery service using pre-Boot authenticated data, as well as secure mapping of the OS target boot drive using the Redfish discovery protocol. In general, the present disclosure allows the user agent option in M-Search to be appended to a UEFI device path, to map the target device in client.

The current UEFI-based Redfish discovery protocol is consistent with the UEFI 2.8 draft Specification, and the UEFI-based Redfish client uses the Redfish discovery protocol to initiate discovery of a drive for the OS. Before the discovery request is sent out, the request header of the M-Search option is modified to add UEFI-based security metadata in the unique service name (USN) field of the M-Search Option for the user agent. An example of a request header is provided below: M-SEARCH*HTTP/1.1; S:uuid: xxx-date-xxx:OEM_SMB; Host: 239.255.255.250:reservedSSDPport; Man: "ssdp:discover"; ST: OEM:DiscoverSecureNetworkMappingClients; MX: 3.

In this example, OEM_SMB can be the OEM Specific credential that needs to be validated in the Server( ) to validate the keys and/or digital signature in the request header. Once the Field is validated, the server can respond back with HTTP 1.1/200 OK with SecureServerResponseKey( ), HTTP/1.1 200 OK, S: uuid:zzz-date-zzz, Ext: Cache-Control: no-cache="Ext", max-age=5000, ST: ge:fridge, USN: uuid:abcdefgh-dateijl:OEM_SMB_ResponseKey( ), AL: <blender:ixl> http://foo/bar.

On the Redfish service or other suitable service that exposes the OS based target, the service can authenticate the metadata in the user agent as described above. Once the Request is authenticated with the response from the server, the server can also add the OEM_SMB_ResponseKey( ) for the client that this request is authenticated. The Redfish or other service initiating client validates the response key, which can be a digital signature, a public key or other suitable validation techniques. If the response key in the USN is valid, the client can then map the network drive for OS boot.

Using the discovery protocol, such as an M-Search algorithm, and authenticating to the service using M-Search options that have security tags associated in them, provides a method to detect services, and also reduces or eliminates vulnerabilities in the SSDP protocol. By using the authentication part of the M-Search options in an OEM-specific manner, it is possible to securely map OS load to an attached storage, iSCSI based storage or other suitable storage for OS boot. This process can be adapted for pre-boot processes that use a Discovery protocol, such as for mapping a driver for OS Boot.

FIG. 1 is a diagram of an algorithm 100 to securely map a target drive using a client and a server, in accordance with an example embodiment of the present disclosure. Although algorithm 100 is shown as a ladder diagram, it can also or alternatively be implemented as a flow chart, a state diagram, using an object oriented programming or in other suitable manners.

Algorithm 100 begins at 102 with a secure UEFI network mapping client or other suitable client processes, which typically operate on a processor that includes executable code that is configured in accordance with the present disclosure to interface with a secure UEFI server at 104 or other suitable servers. The secure UEFI network mapping client or other suitable client process initializes a secure discovery process at 106, and initiates an iSCSI mapped drive using a secure server 104 or other suitable processes. As part of that process, the secure UEFI network mapping client or other suitable client transmits a UEFI-based discovery request using SSDP or other suitable processes at 110, which causes the secure UEFI server or other suitable server at 104 to authenticate the USN from the M-Search protocol at 112, as discussed above. Once the USN is authenticated at 114, the secure UEFI server or other suitable server transmits an SSDP response at 116 to the secure UEFI network mapping client or other suitable client process. The secure UEFI network mapping client or other suitable client process then determines that the response is OK at 118 and authenticates the response. After authentication, the secure iSCSI or other suitable network drive is mapped at 120, and the OS boots at 122.

In operation, algorithm 100 implements secure mapping of a target for OS boot using a non-secure communications protocol, such as SSDP M-Search, by adding authentication, public key or other suitable processes. Algorithm 100 thus prevents a non-secure protocol from being exploited as part of the OS booting process.

FIG. 2 is a diagram of a system 200 to securely map a target drive for OS boot using a secure M-Search protocol, in accordance with an example embodiment of the present disclosure. System 200 includes secure UEFI network mapping client 202, secure UEFI server 204, target A 206 through target N 208 and key server 210, each of which can be implemented in hardware or a suitable combination of hardware and software.

Secure UEFI network mapping client 202 includes a processor with firmware that is configured to obtain an OS image from a remote location during boot. In one example embodiment, secure UEFI network mapping client 202 is configured to generate an M-Search request to locate a target drive. While secure UEFI network mapping client 202 is disclosed as using UEFI and M-Search, other suitable firmware architectures, operating system boot processes and communications protocols can also or alternatively be used.

Secure UEFI server 204 includes a processor that is configured to receive and process requests from secure UEFI network mapping client 202, such as to authenticate secure UEFI network mapping client 202 and to provide a target drive for secure UEFI network mapping client 202 to obtain an OS image during OS boot. While secure UEFI server 204 is disclosed as using UEFI and M-Search, other suitable firmware architectures, operating system boot processes and communications protocols can also or alternatively be used.

Target A 206 through target N 208 are suitable drive locations for providing an OS image to secure UEFI network mapping client 202. In one example embodiment, target A 206 through target N 208 can be secure locations that are not publicly available, can be authenticated by secure UEFI server 204, or can otherwise be verified as a secure source for an OS image.

Key server 210 responds to requests for encryption keys, such as from processors that are engaged in secure communications. In one example embodiment, key server 210 can receive a communication that includes a public key and can respond with a private key that must be used to decrypt an associated encrypted data message. Likewise, other suitable processes can also or alternatively be used to provide secure data communications and to authenticate secure UEFI network mapping client 202, secure UEFI server 204, target A 206 through target N 208, key server 210 and other suitable components of a secure messaging system in accordance with the teachings of the present disclosure.

FIG. 3 is a diagram of an algorithm 300 to securely map a target drive for OS boot using a secure M-Search protocol, in accordance with an example embodiment of the present disclosure. Although algorithm 300 is shown as a flow chart, it can also or alternatively be implemented as a ladder diagram, a state diagram, using an object oriented programming or in other suitable manners.

Algorithm 300 begins at 302 where a discovery protocol is initiated. In one example embodiment, the discovery protocol can be initiated by a client in a secure data messaging context, such as during a boot process, in order to obtain OS code from a secure source. Likewise, other suitable applications can also or alternatively be used. The algorithm then proceeds to 304.

At 304, security metadata is added to an M-Search formatted message, or other suitable non-secure messaging formatted messages. In one example embodiment, the security metadata can be added to an M-Search USN field or other suitable fields. The algorithm then proceeds to 306.

At 306, the message with security metadata is transmitted to a secure server. In one example embodiment, the message can be transmitted by a secure UEFI network mapping client to a secure UEFI server, or other suitable processes can also or alternatively be used. The algorithm then proceeds to 308.

At 308, the metadata is authenticated. In one example embodiment, the metadata can be authenticated using public key cryptography, a digital signature or in other suitable manners. The algorithm then proceeds to 310.

At 310, it is determined whether the metadata was authenticated. In one example embodiment, the failure to authenticate the metadata can result in a fail status, the inability to decrypt an encrypted message, or other suitable indicators of a failure to authenticate. If it is determined that the metadata was not authenticated, the algorithm proceeds to 312 where an error message is generated. An indication can also or alternatively be generated that the sender of the message has been compromised. Otherwise, the algorithm proceeds to 314.

At 314, a response key is added to a reply message. In one example embodiment, the response key can include a public key for use in public key cryptography, or other suitable processes can also or alternatively be used. The message can also be supplemented to include path data for mapping a path for an OS boot process, or other suitable data. The algorithm then proceeds to 316.

At 316, the reply message is transmitted to the client. In one example embodiment, a secure UEFI server can reply to a message that was received from a secure UEFI network mapping client, or other suitable processes can also or alternatively be used. The algorithm then proceeds to 318.

At 318, the response key is authenticated. In one example embodiment, the response key can be authenticated using public key cryptography, a digital signature or in other suitable manners. The algorithm then proceeds to 320.

At 320, it is determined whether the response key was authenticated. In one example embodiment, the failure to authenticate the response key can result in a fail status, the inability to decrypt an encrypted message, or other suitable indicators of a failure to authenticate. If it is determined that the response key was not authenticated, the algorithm proceeds to 322 where an error message is generated. An indication can also or alternatively be generated that the sender of the message has been compromised. Otherwise, the algorithm proceeds to 324.

At 324, a drive where an OS image can be obtained is mapped to a client for use during an OS boot process. Other suitable processes can also or alternatively be performed. The algorithm then terminates or continues with another suitable process.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for secure data communications using an insecure protocol, comprising:
   generating a data message at a data processor client;
   adding a security key to the data message using the data processor client by adding security metadata to a USN field of an M-Search message;
   transmitting the data message to a remote data processor receiver over a data network;
   determining whether the data message is authentic at the remote data processor receiver; and
   automatically responding to the data message using the remote data processor with a location where additional data can be obtained from the remote data processor receiver if it is determined by the remote data processor receiver that the data message is authentic.

2. The method of claim 1 wherein generating the data message at the data processor client comprises generating an M-Search protocol message at a secure UEFI network mapping client.

3. The method of claim 1 wherein transmitting the data message to the remote data processor receiver over the data network comprises transmitting a request for a target drive for an operating system image to a secure UEFI server.

4. The method of claim 1 wherein determining whether the data message is authentic at the remote data processor receiver comprises accessing a public key server to authenticate the data message.

5. The method of claim 1 wherein automatically responding to the data message with the location where additional data can be obtained from the remote data processor receiver if it is determined by the remote data processor receiver that the data message is authentic comprises automatically responding to the data message with the location where an operating system image can be obtained.

6. A system for secure data communications using an insecure protocol, comprising:
   a data processor client configured to generate a data message, to add a security key to the data message and to transmit the data message to a remote data processor receiver over a data network; and
   the remote data processor receiver configured to determine whether the data message is authentic and to automatically respond to the data message with a location where additional data can be obtained from if it is determined that the data message is authentic, wherein the data processor client is configured to add security metadata to an M-Search message.

7. The system of claim 6 wherein the data processor client is configured to generate an M-Search protocol message at a secure UEFI network mapping client.

8. The system of claim 6 wherein the data processor client is configured to transmit a request for a target drive for an operating system image to a secure UEFI server.

9. The system of claim 6 wherein the remote data processor receiver is configured to access a public key server to authenticate the data message.

10. The system of claim 6 the remote data processor receiver is configured to automatically respond to the data message with the location where an operating system image can be obtained.

11. A non-transitory data memory device storing instructions that cause one or more processors to perform the steps of: generating a data message at a data processor client; adding a security key to the data message using the data processor client by adding metadata to an M-Search message; transmitting the data message to a remote data processor receiver over a data network; determining whether the data message is authentic at the remote data processor receiver; and automatically responding to the data message using the remote data processor with a location where additional data can be obtained from the remote data processor receiver if it is determined by the remote data processor receiver that the data message is authentic.

12. The non-transitory data memory device of claim 11 wherein generating the data message at the data processor client comprises generating an M-Search protocol message at a secure UEFI network mapping client.

13. The non-transitory data memory device of claim 11 wherein transmitting the data message to the remote data processor receiver over the data network comprises transmitting a request for a target drive for an operating system image to a secure UEFI server.

14. The non-transitory data memory device of claim 11 wherein determining whether the data message is authentic at the remote data processor receiver comprises accessing a public key server to authenticate the data message.

15. The non-transitory data memory device of claim 11 wherein automatically responding to the data message with the location where additional data can be obtained from the remote data processor receiver if it is determined by the remote data processor receiver that the data message is authentic comprises automatically responding to the data message with the location where an operating system image can be obtained.

* * * * *